(12) United States Patent
Mostert et al.

(10) Patent No.: US 6,859,547 B2
(45) Date of Patent: Feb. 22, 2005

(54) METHODS AND COMPUTER-READABLE MEDIUM FOR TRACKING MOTION

(75) Inventors: Paul S. Mostert, Lexington, KY (US); Christopher O. Jaynes, Lexington, KY (US); William B. Seales, Nicholasville, KY (US); R. Matt Steele, Lexington, KY (US); Stephen B. Webb, Lexington, KY (US)

(73) Assignee: The Mostert Group, Lexington, KY (US)

( * ) Notice: Subject to any disclaimer, the term of this patent is extended or adjusted under 35 U.S.C. 154(b) by 17 days.

(21) Appl. No.: 10/351,176

(22) Filed: Jan. 25, 2003

(65) Prior Publication Data

US 2004/0146182 A1 Jul. 29, 2004

(51) Int. Cl.[7] .................................................. G06K 9/00
(52) U.S. Cl. ...................... 382/103; 382/107; 348/169
(58) Field of Search .............................. 382/103, 107, 382/236, 311, 312; 348/154–155, 157, 169; 375/240.01

(56) References Cited

U.S. PATENT DOCUMENTS

| | | | |
|---|---|---|---|
| 3,999,611 A | | 12/1976 | Bucalo |
| 4,233,845 A | | 11/1980 | Pratt, Jr. |
| 4,600,016 A | * | 7/1986 | Boyd et al. ................. 600/595 |
| 4,774,679 A | | 9/1988 | Carlin |
| 5,186,062 A | | 2/1993 | Roost |
| 5,369,601 A | | 11/1994 | Tannenbaum |
| 5,513,103 A | | 4/1996 | Charlson |
| 5,734,923 A | * | 3/1998 | Sagawa et al. ........... 175/500.1 |
| 6,104,864 A | * | 8/2000 | Kondo et al. ................ 386/117 |
| 6,301,964 B1 | | 10/2001 | Fyfe et al. |
| 6,454,679 B1 | | 9/2002 | Radow |
| 6,545,705 B1 | * | 4/2003 | Sigel et al. .................. 348/157 |
| 6,567,536 B2 | * | 5/2003 | McNitt et al. ............... 382/107 |
| 6,654,483 B1 | * | 11/2003 | Bradski ....................... 382/107 |

OTHER PUBLICATIONS

Raibert, et al. "Animation of Dynamic Legged Locomotion", ACM, pp. 349–358, 1991.*

* cited by examiner

*Primary Examiner*—Daniel Miriam
(74) *Attorney, Agent, or Firm*—King & Schickli, PLLC

(57) ABSTRACT

In a computer system, methods and computer-readable medium are disclosed for tracking motion of a subject in an activity captured by camera. The camera supplies pluralities of discrete images of the subject to a computing system environment. An event window, displayed on a monitor, has at least two cells for receiving a user input pertaining to an action of the subject in the activity. In a first of the two cells, the user indicates a specific image number corresponding to one of the plurality of discrete images and an estimate of a fractional percent thereof. In the second cell, the user indicates another specific image number and estimate of a fractional percentage thereof. Software calculates a delta between the specific image numbers and their corresponding estimated fractions. Scroll and position bars provide user-aid for navigating between discrete images. Example subjects include horses in a horse race activity while an action includes a horse stride length.

21 Claims, 8 Drawing Sheets

METHODS AND COMPUTER-READABLE MEDIUM FOR TRACKING MOTION

CONTRACTUAL ORIGIN OF THE INVENTION

The United States government has rights in this invention under 35 U.S.C. §203 pursuant to a contract, No. DMI-0091510, between the National Science Foundation government agency and one or more of the inventors or assignees of the one or more inventors.

FIELD OF THE INVENTION

The present invention relates to tracking motion of a subject in an activity, such as tracking motion of a horse in a horse race. In particular, it relates to methods and computer-readable medium for determining an action, such as a horse stride length, in an activity having been captured by camera. Even more particularly, actions become determined by user input of image numbers from the camera captured images and user estimates of fractional percentages of the image numbers. In other aspects, users navigate through display monitor windows by novel scrolling techniques or movement of a positional bar.

COPYRIGHTED MATERIALS

A portion of the disclosure of this patent document contains materials to which a claim of copyright protection is made. The copyright owner has no objection to the reproduction by anyone of the patent document or the patent disclosure as it appears in the U.S. Patent and Trademark Office patent files or records, but reserves all other rights with respect to the copyrighted work.

BACKGROUND OF THE INVENTION

The art of tracking motion of a subject in an activity with a camera is relatively well known. In general, a camera captures pluralities of discrete video images (frames) of the activity and each frame becomes analyzed.

With some motion tracking devices, a two-dimensional grid corresponding to the two-dimensions of the video image frames has data points plotted thereon that correspond to a particular feature of the subject. For example, to assess a horse stride length, it is important to know when each leg of the horse leaves the ground and when it returns to the ground. Thus, a horse's hoof as seen in each video frame may be plotted on the grid and a curve fit to the data points. Often times a transmitter device, which communicates to a receiver associated with a computing system to which the camera capturing the activity is attached, may be secured to the horse's hoof to assist in providing a cross-reference for the grid. Other times, reflectors or color contrasting devices attach to the horse's hoof.

This technique, however, suffers numerous shortcomings. For instance, each and every frame of the video must supply information about the horse's hoof to have an effective plot. This makes the technique labor intensive. Still further, the technique suffers because the subject, e.g., horse, may be running in a multi-horse race activity and in every frame the horse's hoof may not be fully visible. In turn, estimating the hoof position is impractical. Horses are also required to have the same equipment in a race and thus hoof-transmitters are not acceptable devices.

Accordingly, the art of motion tracking desires simple yet effective techniques for assessing actions of a subject in an activity while maintaining practicality.

SUMMARY OF THE INVENTION

The above-mentioned and other problems become solved by applying the principles and teachings associated with the hereinafter described methods and computer-readable medium for tracking motion.

In one embodiment, the present invention teaches methods for tracking motion of a subject in an activity captured by camera. The camera supplies pluralities of discrete images of the subject to a computing system environment. An event window, displayed on a monitor in the computing system environment, has at least two cells for receiving a user input pertaining to an action of the subject. In a first of the two cells, the user indicates a specific image number corresponding to one of the plurality of discrete images and estimates and enters a fraction of the specific image number. In the second cell, the user indicates another specific image number and another estimated fraction. Users estimate fractions by comparing between one of the pluralities of discrete images and a one larger discrete image. Users indicate their preferences by a single trigger signal, initiated by the click of a pointing device in the specific cell or by depressing a button or key stoke which automatically enters the current image number in the cell. An example subject includes a race horse in a horse race activity. An example action includes a horse stride length.

In another aspect of the invention, delta values between the user inputs of the two cells become calculated and displayed in another cell of the event window. Averages of all delta values may also be calculated and displayed.

In still another aspect, one or more subjects have profiles compiled from the user inputs supplied in the event window. Software compares the profile(s) against stored profile(s) and indicates a best or hierarchy profile indicating the best or hierarchy ranking of the subjects.

Techniques for navigating between the pluralities of discrete images displayed in an image window of a monitor in a computing system environment include configuring a scroll bar to jump to exact specific image numbers based upon user learned information and/or maneuvering a position bar in a graphics window.

Computer-readable medium having computer-executable instructions are also disclosed that perform some or all of the above methods.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and their equivalents. In accordance with the present invention, we hereinafter describe methods and computer-readable medium for tracking motion of a subject in an activity.

Figure 7:
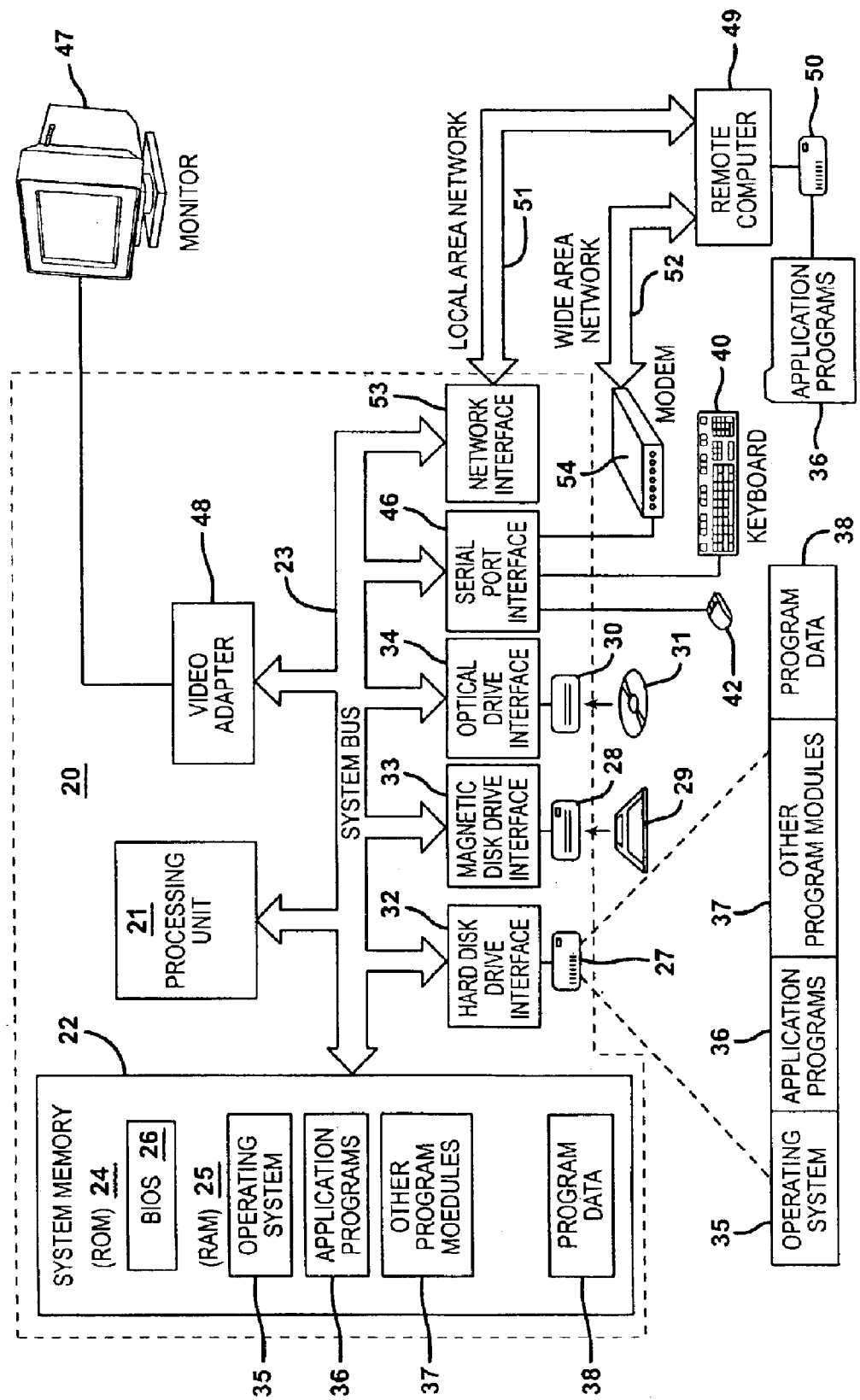
FIG. 7 is an exemplary system in accordance with the teachings of the present invention providing a suitable operating environment for carrying out the tracking of motion of a subject in an activity.

Appreciating users of the invention will likely accomplish some aspect of the methods in a computing system environment, FIG. 7 and the following discussion are intended to provide a brief, general description of a suitable computing environment in which either the structure or processing of embodiments may be implemented. Since the following may be computer implemented, particular embodiments may range from computer executable instructions as part of computer readable media to hardware used in any or all of the following depicted structures. Implementation may additionally be combinations of hardware and computer executable instructions.

When described in the context of computer readable media having computer executable instructions stored thereon, it is denoted that the instructions include program modules, routines, programs, objects, components, data structures, patterns, trigger mechanisms, signal initiators, etc. that perform particular tasks or implement particular abstract data types upon or within various structures of the computing environment. Executable instructions exemplarily comprise instructions and data which cause a general purpose computer, special purpose computer, or special purpose processing device to perform a certain function or group of functions.

The computer readable media can be any available media which can be accessed by a general purpose or special purpose computer. By way of example, and not limitation, such computer readable media can comprise RAM, ROM, EEPROM, CD-ROM or other optical disk storage devices, magnetic disk storage devices or any other medium which can be used to store the desired executable instructions or data fields and which can be assessed by a general purpose or special purpose computer. Combinations of the above should also be included within the scope of the computer readable media. For brevity, computer readable media having computer executable instructions may be referred to as "software" or "computer software".

With reference to FIG. 7, an exemplary system for implementing the invention includes a general purpose computing device in the form of a conventional computer 20. The computer 20 includes a processing unit 21, a system memory 22, and a system bus 23 that couples various system components including the system memory to the processing unit 21. The system bus 23 may be any of the several types of bus structures including a memory bus or memory controller, a peripheral bus, and a local bus using any of a variety of bus architectures. The system memory includes read only memory (ROM) 24 and a random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive, not shown, a magnetic disk drive 28 for reading from and writing to removable magnetic disk 29, and an optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20.

Although the exemplary environment described herein employs a hard disk, a removable magnetic disk 29 and a removable optical disk 31, it should be appreciated by those skilled in the art of other types of computer readable media which can store data accessible by a computer include magnetic cassettes, flash memory cards, digital video disks, removable disks, Bernoulli cartridges, random access memories (RAMs), read only memories (ROM), and the like.

Other storage devices are also contemplated as available to the exemplary computing system. Such storage devices may comprise any number or type of storage media including, but not limited to, high-end, high-throughput magnetic disks, one or more normal disks, optical disks jukeboxes of optical disks, tape silos, and/or collections of tapes or other storage devices that are store-off line. In general however, the various storage devices may be partitioned into two basic categories. The first category is local storage which contains information that is locally available to the computer system. The second category is remote storage which includes any type of storage device that contains information that is not locally available to a computer system. While the line between the two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk, magnetic disk 29, optical disk 31, ROM 24 or RAM 25, including an operating system 35, one or more application programs 36, other program modules 37, and program data 38. Such application programs may include, but are not limited to, random generation modules, such as Monte Carlo simulators and graphic modules or modeling modules for generating graphics and models for users display, graphical user interfaces, image processing modules, intelligent systems modules (such as neural networks, probablistic surface modelers, biometrics modelers), specialized image tracking modules, camera control modules, camera acquisition modules, GUI development systems or other. A user may enter commands and information into the computer 20 through input devices such as keyboard 40 and pointing device 42. Other input devices (not shown) may include a microphone, joy stick, game pad, satellite dish, scanner, or the like. These and other input devices are often connected to the processing unit 21 through a serial port interface 46 that couples directly to the system bus 23. It may also connect by other interfaces, such as parallel port, game port, firewire or a universal serial bus (USB). A monitor 47 or other type of display device is also connected to the system bus 23 via an interface, such as a video adapter 48. In addition to the monitor, computers often include other peripheral output devices (not shown), such as speakers and printers. Scanner peripheral devices (not shown) for reading imagery into the computer are often also included.

During use, the computer 20 may operate in a networked environment using logical connections to one or more other computing configurations, such as a remote computer 49. Remote computer 49 may be a personal computer, a server, a router, a network PC, a peer device or other common network node, and typically includes many or all of the elements described above relative to the computer 20, although only a memory storage device 50 having application programs 36 has been illustrated in FIG. 10. The logical connections between the computer 20 and the remote computer 49 include a local area network (LAN) 51 and/or a wide area network (WAN) 52 that are presented here by way of example and not limitation. Such networking environments are commonplace in offices with enterprise-wide computer networks, intranets and the Internet, but may be adapted for use in a mobile or on-site manner at multiple and/or changing locations.

When used in a LAN networking environment, the computer 20 is connected to the local area network 51 through a network interface or adapter 53. When used in a WAN networking environment, the computer 20 typically includes a modem 54, T1 line, satellite or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the local or remote memory storage devices and may be linked to various processing devices for performing certain tasks. It will be appreciated that the network connections shown are exemplary and other means of establishing a communications link between the computers may be used.

Moreover, those skilled in the art will appreciate that the invention may be practiced with other computer system configurations, including hand-held devices, multi-processor systems, micro-processor-based or programmable consumer electronics, network PCs, minicomputers, computer clusters, main frame computers, and the like.

Figure 1:
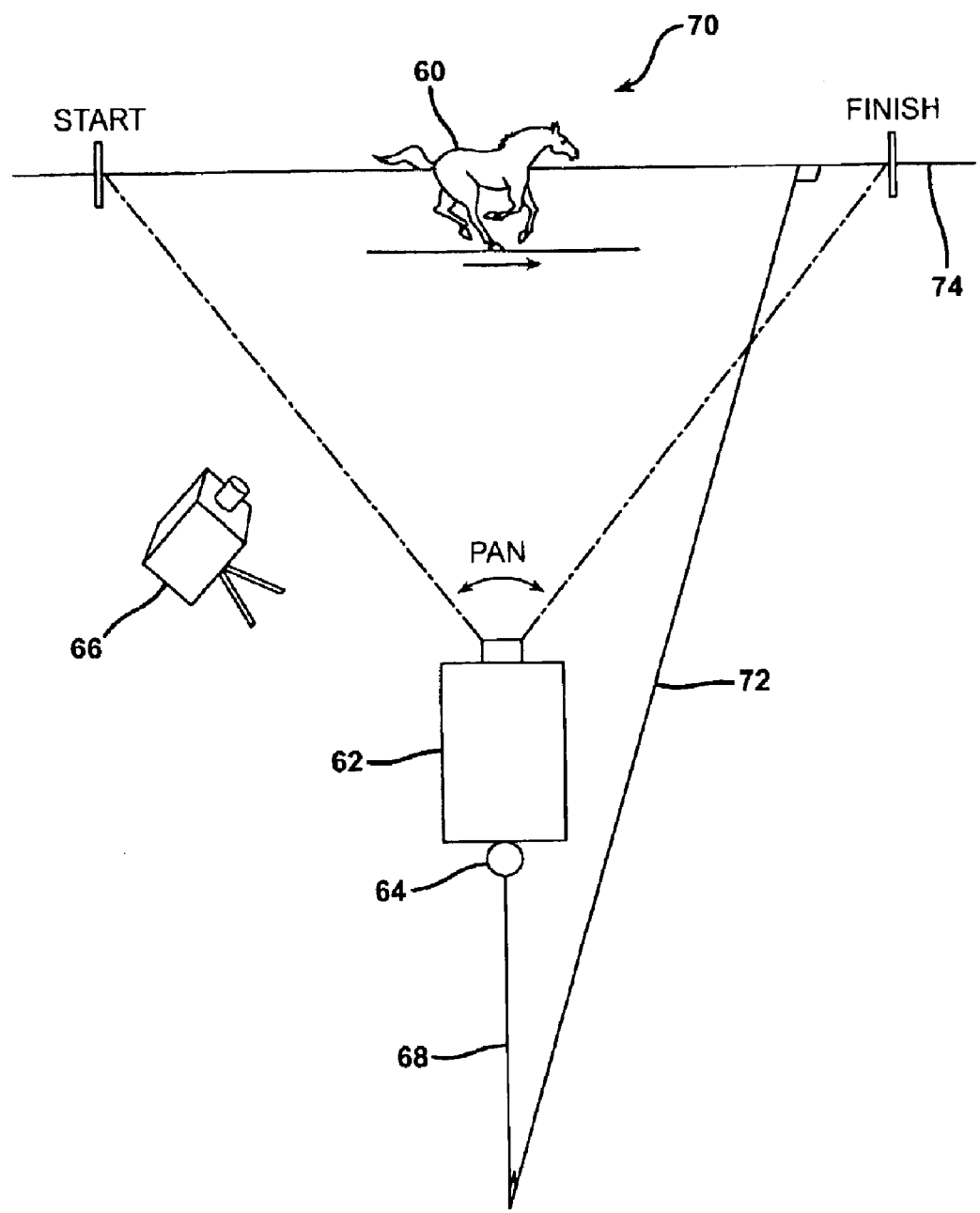
FIG. 1 is a diagrammatic view in accordance with the teachings of the present invention of a subject in an activity captured by camera.

With reference to FIG. 1, the tracking motion methods of the present invention are practiced after capturing images by a camera 62 of a moving subject 60 in an activity, such as a horse running in a time trial or a horse race 70. In general, the camera 62 captures pluralities of discrete images, analog or digital, of the subject between some start and finish position. The subject and nature of the activity defines how many images you need to accurately track a subject's motion and no specific number is required herein. To facilitate smooth camera panning and tilting during image capture, which ultimately serves to remove image jitter, the camera 62 may mount on a motorized unit 64 controlled by a computer, such as computer 20. Preferably, although not required, the field of view of the camera adjusts to focus primarily on the subject and not superfluous images. In other embodiments, however, the invention contemplates a field of view so large that the camera need not pan or tilt to capture images of the moving subject.

Regarding camera geometry, the camera 62 preferably mounts such that its pan axis is orthogonal to the plane that intersects the ground plane 72 in the line 74 in which the subject travels. To facilitate image evaluation, the distance of the camera 62 from the subject and height above/below the linear path of the subject are known and preferably maintained constant. An additional camera(s) 66 may be coordinated with camera 62 to provide cross-referenced captured images of the subject. The additional camera(s) 66 may be fixed, i.e., no panning or tilting, or fully moveable.

Figure 2:
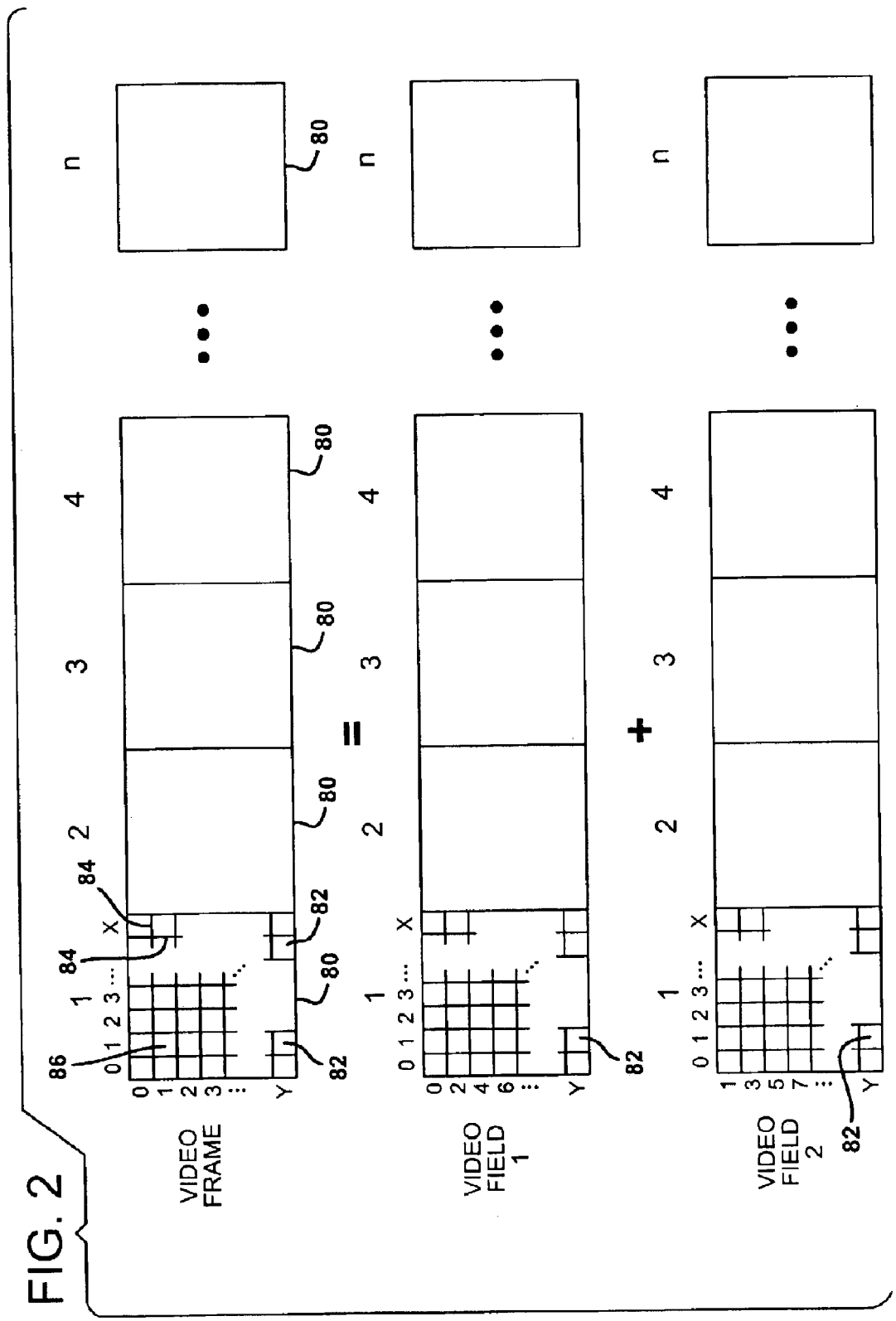
FIG. 2 is a diagrammatic view in accordance with the teachings of the present invention of a composite video frame from the camera of FIG. 1.

With reference to FIG. 2, the camera typically captures the subject as a series of video frames 80 having video frame numbers ranging from 1,2,3,4, through n. As is known in the art, each discrete video frame comprises a plurality of pixels 82 having red, green, blue®, G,B) components ranging from 0–255 discrete values arranged as squares defined by x-axis and y-axis lines 84. Each individual pixel 82 can be located by defining a row or column number. As shown, rows range from 0,1,2,3, . . . y while columns range from 0,1,2,3, . . . x. Thus, the location of pixel 86 corresponds to row 1, column 1. As further known in the art, each video frame 1,2,3,4, . . . n is a compilation of two video fields (indicated by the equal sign and plus sign between video field 1 and video field 2). Those skilled in the art will appreciate video field 1 only comprises pixels 82 containing columns and even-numbered rows while video field 2 only comprises pixels 82 containing columns and odd-numbered rows.

Figure 3:
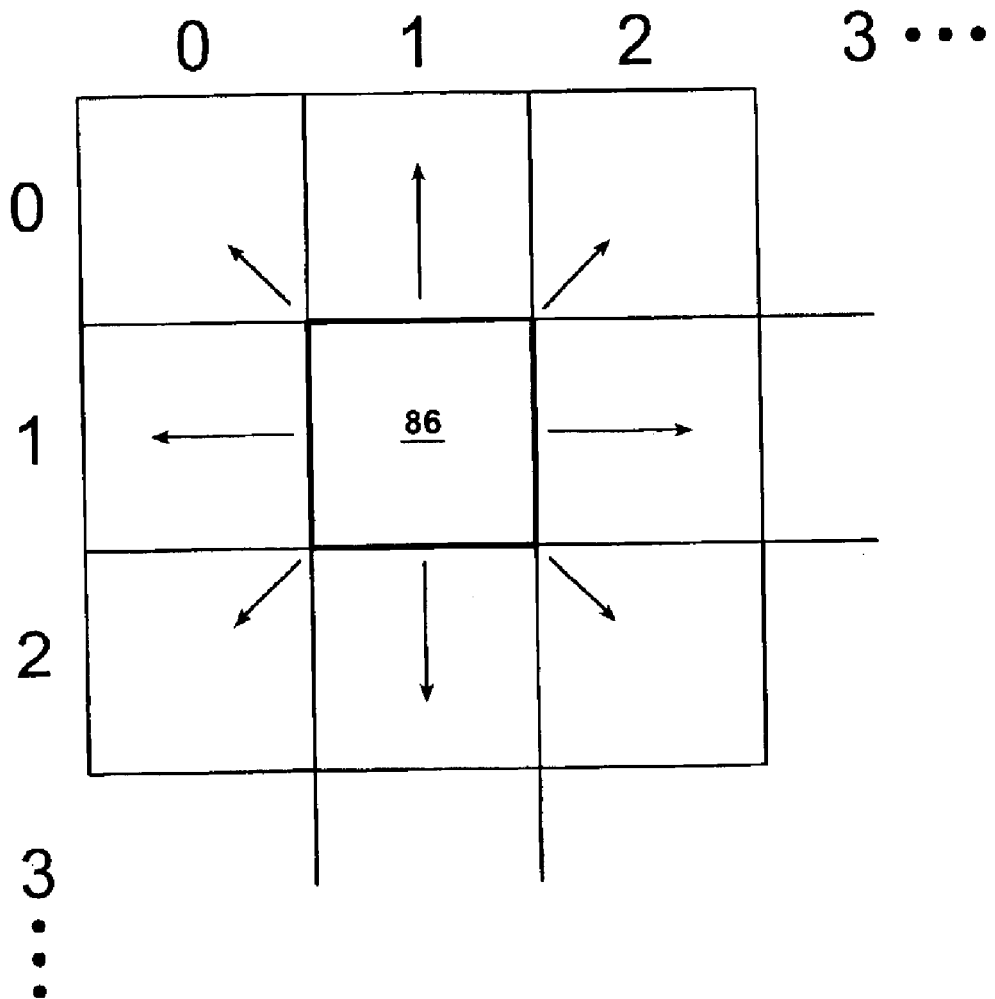
FIG. 3 is a diagrammatic view in accordance with the teachings of the present invention of a quantization process of a pixel of interest from the video frame of FIG. 2.
Figure 4:
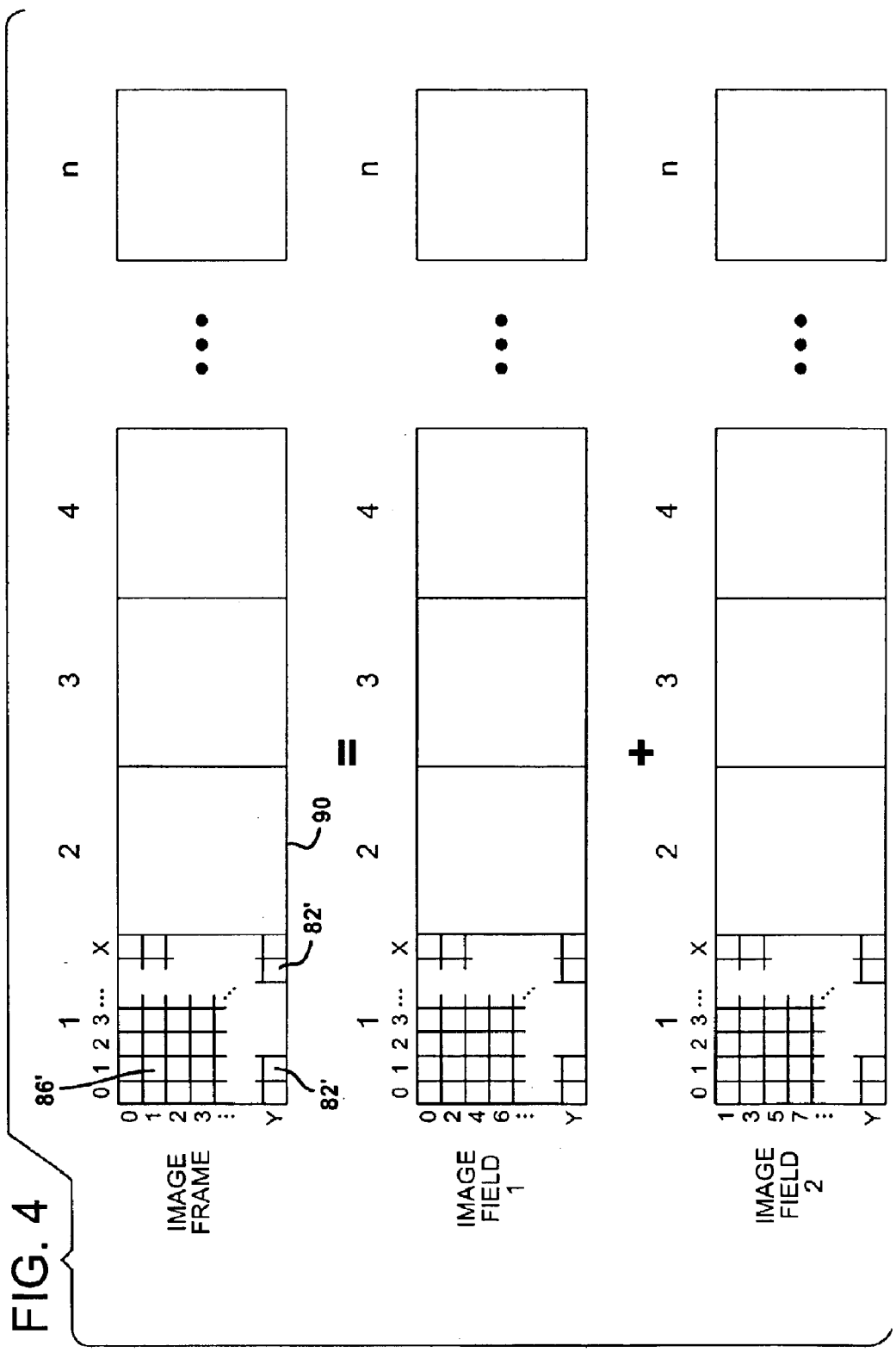
FIG. 4 is a diagrammatic view in accordance with the teachings of the present invention of a composite image frame.

To arrive at a preferred image suitable for practicing the present invention, each pixel of the video frame 80 has a new R, G, B value computed by ignoring its video frame R, G, B value and averaging the R, G, B values for some or all of its neighboring pixels (indicated by arrows surrounding exemplary pixel 86 at row 1, column 1 in FIG. 3). Thereafter, each new computed R, G, B value becomes compiled and an image frame 90 results. As an example, pixel 86 from FIGS. 2 and 3 gets transformed into pixel 86' in FIG. 4. Likewise, pixels 82 have become pixels 82'. Similar to the video frame, the image frame is a compilation of two image fields, image field 1 and image field 2, which correspond to even- or odd-numbered rows and columns of pixels.

Although a preferred image suitable for practicing the invention has heretofore been described as an image frame 90 derived from video frame 80, the invention is not so limited and contemplates tracking motion from either the original video frames/fields, the image frames/fields, combinations thereof or other. Thus, the terms "discrete images" or "pluralities of discrete images" in the claims includes any or all of the frames/fields previously described and equivalents thereof.

Figure 5:
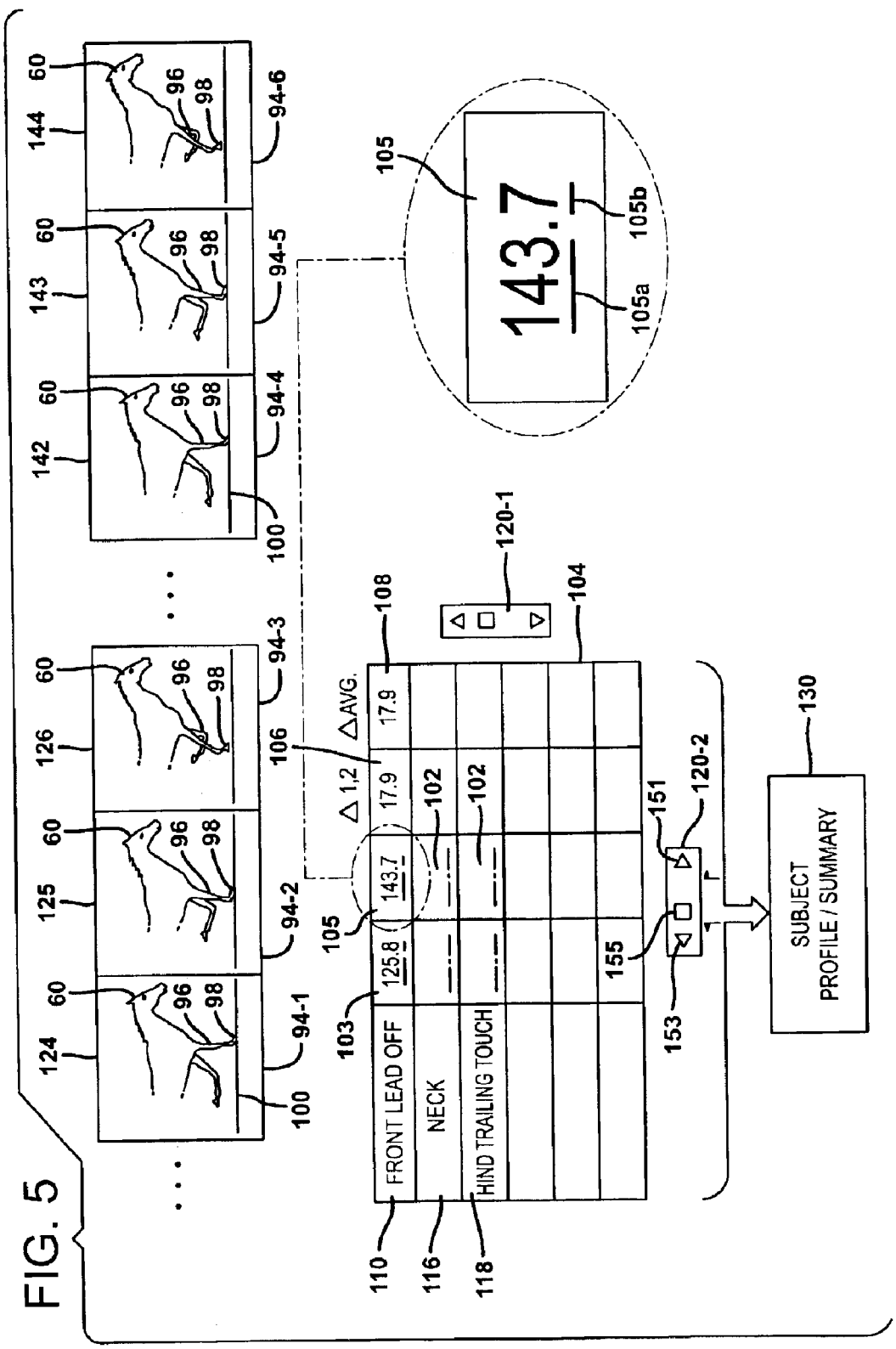
FIG. 5 is a diagrammatic view in accordance with the teachings of the present invention of a subject having its motion tracked.
Figure 6:
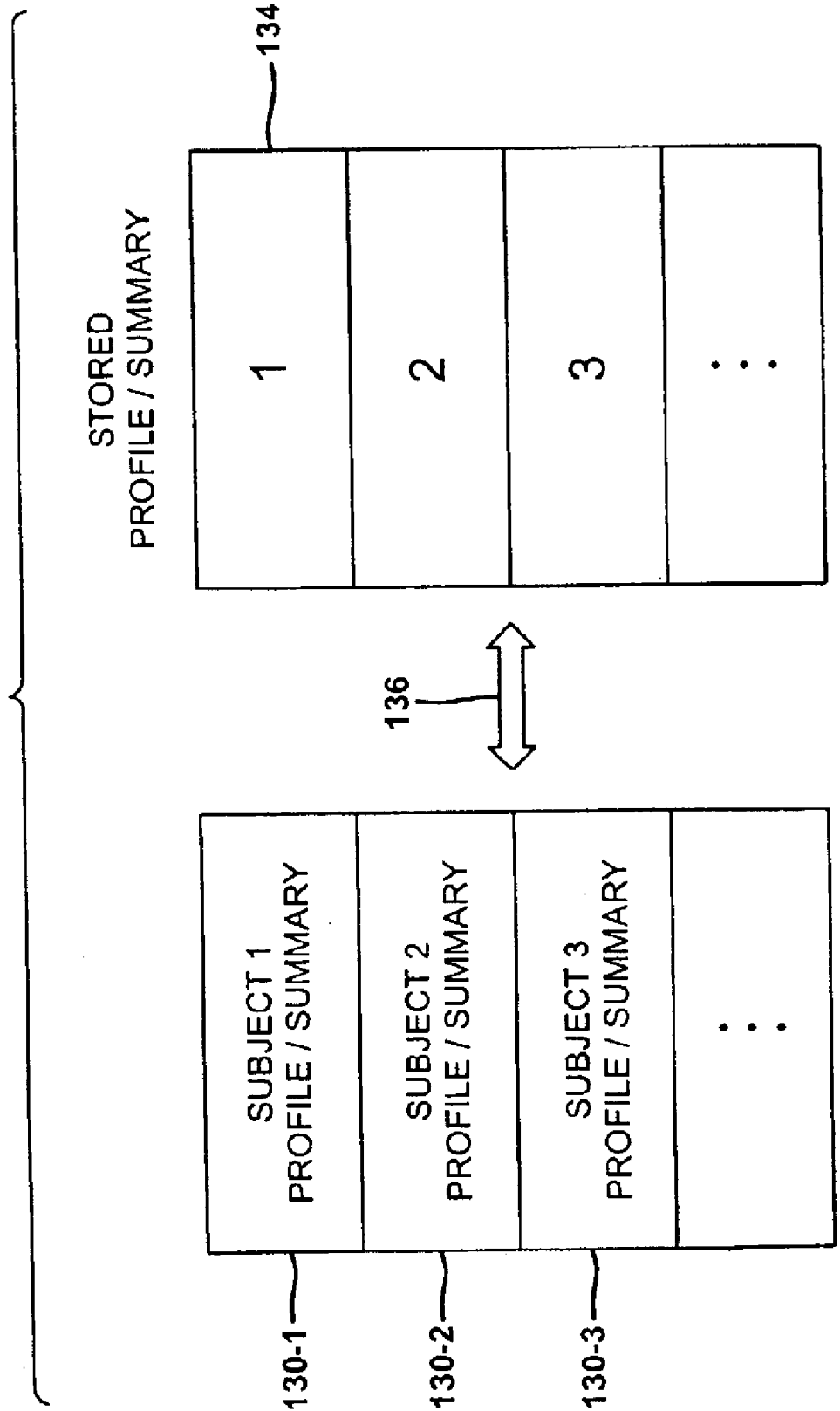
FIG. 6 is a diagrammatic view in accordance with the teachings of the present invention of a subject profile/summary being compared to a stored profile/summary.

With reference to FIG. 5, the tracking of motion of a subject 60 occurs after the computing system environment receives the pluralities of discrete images 94-1 through 94-6 (having specific image numbers 124, 125, 126 and 142,143, 144) from a camera capturing the activity of the subject. As seen in the discrete images, a horse (subject 60) transitions his front lead leg 96 through a series of positions where his hoof 98 nears the ground 100 (94-1, 94-4), contacts the ground (94-2, 94-5) and lifts off the ground (94-3, 94-6). To calculate a horse stride length, for example, a person would measure the ground distance traveled by the horse from a first position where hoof 98 of front lead leg 96 first lifts off the ground to a second position where the same hoof leaves the ground the next sequential time.

With the present invention, however, this horse stride length can now be simply and easily done by entering single- or double-keystroke user input(s) into cells 102 of an event window 104. As a representative example, two data cells 103, 105 of the event window 104 corresponding to the action 110, Front Lead Off, receives user inputs 125.8 and 143.7 respectively.

Each of these user inputs pertains to a specific image number from the pluralities of discrete images to the left of the decimal point (i.e., 125 or 143) and an estimate regarding a fraction of the specific image number to the right of the decimal point (i.e., 8 or 7). The enlarged data cell 105 more clearly depicts the specific image number 143 as 105*a* and the estimate 7 as 105*b*. The specific image number and the estimate together equal an entry in the data cell.

The manner in which a user arrives at both the specific image number and the estimate includes, first, comparing the plurality of specific image numbers and noting the last specific image number in which the hoof 98 remains in contact with the ground (specific image number 125 and specific image number 143) and, second, comparing the image of that specific image number with a one larger discrete image (in this instance, compare specific images 125 and 126 and specific image numbers 143 and 144). Based upon the comparison, a user should input their estimate of a fraction regarding the fractional percentage of the specific image number in which they think the hoof completely left contact with the ground (in this instance, the user deemed fraction 8/10ths and 7/10ths in data cells 103, 105, respectively, as their estimates). Thereafter, in delta cell 106, a difference between the data cells 103, 105 is computed. In this instance, 143.7 minus 125.8 equals 17.9. Then, 17.9 corresponds to the subject horse's stride length. Appreciating that this process can be continued for as many actions or cells desired to be calculated, it is preferred to have more discrete images not less. Still further, the more frames per second that the subject becomes captured, the better the calculations. This invention has been successfully practiced with present day video format NTSC having a frame rate of about 60 fields/second (e.g., 59.94).

In the event the motion tracking process does include additional data cells, a delta average window 108 might be desired in the event window 104 to maintain a running average of all delta values calculated in cell 106. From this teaching, those skilled in the art should be able to envision still other types of cells and calculations that would add utility to an event window. Some representative other actions have been depicted as elements 116 and 118.

In a preferred embodiment, the present invention contemplates a monitor of the computing system to display the event window and a pointing device and keyboard to enter user inputs into the cells. A scroll bar 120-1, 120-2 may be further added to the event window to allow users to conveniently and easily navigate from one action 110 or cell 102 to another.

In the event motion tracking were desired for multiple subjects, additional event windows or additional cells within the same event window could be used to track their motion.

Thereafter, once motion of an action has become calculated, the user input entries contained in the cells are compiled into a subject profile or subject summary 130. As more and more data regarding like subjects becomes compiled, a data base of stored profiles or stored summaries 134 can be built. In sequence, software can compare 136 the profile(s) 130 of the subject(s) against stored profile(s) 134 and indicate a best profile or hierarchy profile ranking of the subjects.

Figure 9:
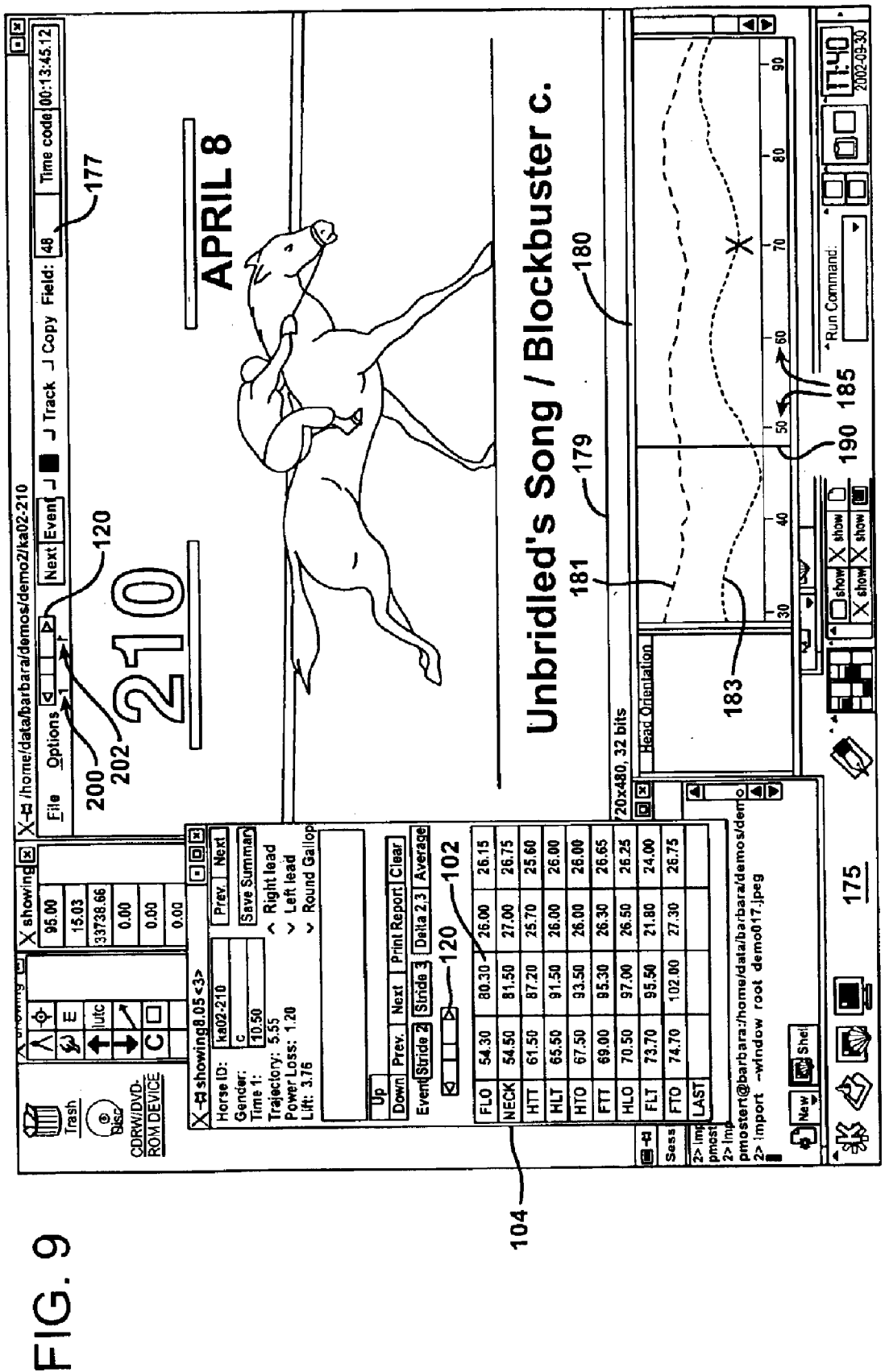
FIG. 9 is an actual view in accordance with the teachings of the present invention from a display monitor of an operating environment showing various windows useful in tracking motion of a subject in an activity.

With reference to FIG. 9, an actual display screen 175 from a monitor in the computing system environment shows one preferred embodiment of the event window 104, attendant cells 102 and scroll bars 120. It also shows a specific image number 48 (indicated by reference number 177) in an image window 179. A graphics window 180 resides beneath the image window 179 and shows plots of various motion tracking curves 181, 183 versus the specific image numbers 185. A position bar 190 defines the specific image number displayed in the image window 179. In this instance, since the specific image number corresponds to 48 (reference number 177), the position bar 190 resides at 48 between 40 and 50.

To navigate between other specific image numbers, a user can take their pointing device and simply "hook and drag" the position bar to any desired position. Alternatively, a user can position their pointing device, at position X, for example, click their pointing device and witness the change in both the position bar 190 being displayed at position X and watch the specific image number change. In this instance, since position X resides at specific image number 70, the position bar 190 would line-up over the 70 and the discrete image in the image window would change to specific image number 70, instead of 48.

Figure 8:
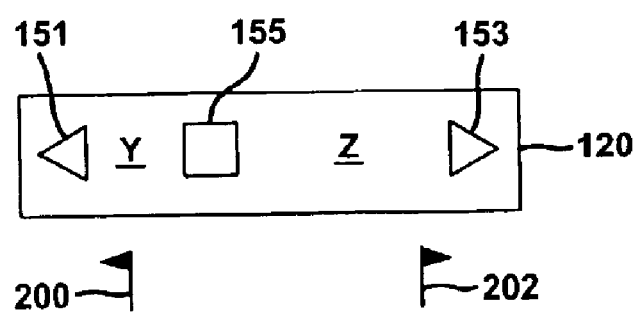
FIG. 8 is a diagrammatic view in accordance with the teachings of the present invention of a scroll bar useful for navigating between discrete images.

In other embodiments, users can navigate between discrete images by utilizing novel features of their scroll bar 120. With reference to FIG. 8, the scroll bar 120 has directional adjustment arrows 151, 153 and a slide 155. Users can change the specific image being displayed on the image window by either "clicking" their pointing device on the directional adjustment arrows (arrow 151 causing a decrease in specific image numbers and arrow 153 causing an increase), hooking and dragging the slide 155 to some increased or decreased specific image number or by indicating a preference by positing their pointing device at positions Y (between the directional arrow 151 and the slide 155) or Z (between the slide 155 and the directional arrow 153), for example, and clicking. Appreciating users will over time learn how far away, in specific image numbers, the next desired specific image resides, users can set an OPTIONAL FIELD (under the Options drag menu in FIG. 9) to move the slide 155 to that exact number of specific images. For example, if a user learns when calculating a horse stride length that hoof 98 of the lead leg leaves the ground about every eighteen (18) specific image numbers apart (as calculated from FIG. 5 by subtracting specific image number 124 from specific image number 142) the user can set the OPTIONAL FIELD equal to eighteen (18). Thence, when the user points and clicks at position Y, the specific image numbers displayed will retard by eighteen (18). Conversely, if they point and click at position Z, the specific image numbers displayed on the image window will advance by eighteen (18). As an example, FIG. 9 shows a specific image number 48 (reference number 177) displayed in the image window 179. If a user were to click at position Y, with the OPTIONAL FIELD set to eighteen (18), the specific image number would become 48−18 or specific image number 30. By pointing and clicking at position Z, the specific image number would become 48+18 or specific image number 66. Users may set the OPTIONAL FIELD to any desired number of specific image numbers.

Bearing in mind that an image frame may comprise tens of thousands of discrete images, two flags 200, 202 are provided to set a range of specific image numbers viewable by the scroll bar 120 at any given time. During use, a user simply hooks the flags 200, 202 with their pointing device and drags them to some desired upper and lower specific image number. By looking at the specific image number displayed in the image window 179, a user can cross-reference their set-flag selections. Often times the images will have "dead-spaces" of images between activities to assist the user in this endeavor.

In still other embodiments, the invention contemplates tracking motion for other subjects, such as bullets, cars, humans, trains, planes, animals, fish, athletes, or the like, in activities such as races, crash reconstruction, trajectories, assessment of habitats or other.

Finally, the foregoing description is presented for purposes of illustration and description of the various aspects of the invention. The descriptions are not intended, however, to be exhaustive or to limit the invention to the precise form disclosed. Accordingly, the embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. In a computer system, a method for tracking motion, comprising:

receiving a plurality of discrete images from a camera having captured a subject in an activity;

providing an event window having at least two cells for receiving a user input, each of said at least two cells pertaining to an action of said subject in said activity;

in one of said at least two cells, receiving a first indication from a user regarding a first specific image number corresponding to one of said plurality of discrete images;

in said one of said at least two cells, receiving a first estimate from said user regarding a first fraction of said first specific image number;

in the other of said at least two cells, receiving a second indication from said user regarding a second specific image number corresponding to another of said plurality of discrete images;

in said other of said at least two cells, receiving a second estimate from said user regarding a second fraction of said second specific image number.

2. The method of claim 1, further including comparing said one of said plurality of discrete images and a one larger discrete image to arrive at said first estimate.

3. The method of claim 1, further including comparing said one another of said plurality of discrete images and a one larger discrete image to arrive at said second estimate.

4. The method of claim 1, wherein said event window further includes a delta cell and said first indication and said first estimate together equal a first entry and said second indication and said second estimate together equal a second entry, displaying a difference between said first entry and said second entry in said delta cell.

5. The method of claim 1, wherein said event window further includes a delta average cell displaying an average of said delta cell.

6. The method of claim 1, wherein said event window further includes a scroll bar for navigating in said event window.

7. The method of claim 1, further including compiling a profile of said subject from said first and second indications and said first and second estimates.

8. The method of claim 7, further including comparing said profile of said subject to a stored profile.

9. In a computer system, a method for tracking motion, comprising:

a) receiving a plurality of discrete images from a camera having captured a subject in an activity;

b) providing an event window having at least two cells for receiving a user input, each of said at least two cells pertaining to a single action of said subject in said activity, said event window further including a delta cell and a delta average cell;

c) in one of said at least two cells, receiving a first indication from a user regarding a first specific image number corresponding to one of said plurality of discrete images;

d) comparing said one of said plurality of discrete images and a first one larger discrete image to achieve a first estimate regarding a first fraction of said first specific image number;

e) in said one of said at least two cells, receiving said first estimate from said user;

in the other of said at least two cells, receiving a second indication from said user regarding a second specific image number corresponding to another of said plurality of discrete images;

f) comparing said another of said plurality of discrete images and a second one larger discrete image to achieve a second estimate regarding a second fraction of said second specific image number;

g) in said other of said at least two cells, receiving said second estimate from said user; and h) wherein said first indication and said first estimate together equal a first entry and said second indication and said second estimate together equal a second entry, displaying a difference between said first entry and said second entry in said delta cell.

10. The method of claim 9, further including compiling a profile of said subject from said first and second entries.

11. The method of claim 10, further including comparing said profile of said subject to a stored profile.

12. The method of claim 9, further including repeating steps a) through h) for a plurality of other subjects.

13. The method of claim 12, further including compiling a plurality of other profiles for each of said plurality of other subjects.

14. The method of claim 13, further including comparing said plurality of other profiles to at least one stored profile.

15. The method of claim 14, after said comparing said plurality of other profiles to at least one stored profile, selecting a best profile from said plurality of other profiles.

16. A computer-readable medium having computer executable instructions stored thereon for performing the steps of claim 15.

17. A computer-readable medium having computer-executable instructions for performing steps comprising:
   receiving a plurality of discrete images from a camera having captured a subject in an activity;
   providing an event window having at least two cells for receiving a user input, each of said at least two cells pertaining to an action of said subject in said activity;
   in one of said at least two cells, receiving a first indication from a user regarding a first specific image number corresponding to one of said plurality of discrete images;
   in said one of said at least two cells, receiving a first estimate from said user regarding a first fraction of said first specific image number;
   in the other of said at least two cells, receiving a second indication from said user regarding a second specific image number corresponding to another of said plurality of discrete images;
   in said other of said at least two cells, receiving a second estimate from said user regarding a second fraction of said second specific image number.

18. The computer-readable medium of claim 17, further including calculating a delta value between said user inputs received in each said at least two cells.

19. The computer-readable medium of claim 18, further including displaying said delta value in a delta cell of said event window.

20. The computer-readable medium of claim 17, further including compiling a profile of said subject based upon said user inputs.

21. The computer-readable medium of claim 20, further including comparing said profile of said subject to a stored profile.

* * * * *